United States Patent
Chen et al.

(10) Patent No.: US 10,623,773 B2
(45) Date of Patent: Apr. 14, 2020

(54) METHOD AND DEVICE FOR ENCODING AND DECODING INTRA-FRAME SKIP MODE INFORMATION

(71) Applicant: SAMSUNG ELECTRONICS CO., LTD., Suwon-si (KR)

(72) Inventors: Jie Chen, Beijing (CN); Jin-young Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/773,101

(22) PCT Filed: Nov. 11, 2016

(86) PCT No.: PCT/KR2016/012977
§ 371 (c)(1),
(2) Date: May 2, 2018

(87) PCT Pub. No.: WO2017/099371
PCT Pub. Date: Jun. 15, 2017

(65) Prior Publication Data
US 2018/0324461 A1    Nov. 8, 2018

(30) Foreign Application Priority Data
Oct. 25, 2016    (KR) .................. 10-2016-0139293

(51) Int. Cl.
*H04N 19/159*    (2014.01)
*H04N 19/107*    (2014.01)
(Continued)

(52) U.S. Cl.
CPC .......... *H04N 19/597* (2014.11); *H04N 13/161* (2018.05); *H04N 19/107* (2014.11);
(Continued)

(58) Field of Classification Search
CPC .... H04N 19/159; H04N 19/187; H04N 19/70; H04N 13/161; H04N 19/107;
(Continued)

(56) References Cited

U.S. PATENT DOCUMENTS

| | | | |
|---|---|---|---|
| 2011/0170593 A1* | 7/2011 | Kim .................. | H04N 19/61 375/240.12 |
| 2013/0136179 A1* | 5/2013 | Lim .................. | H04N 19/176 375/240.13 |

(Continued)

FOREIGN PATENT DOCUMENTS

| | | | |
|---|---|---|---|
| JP | 2015-92762 A | | 5/2015 |
| KR | 10-2013-0030240 A | | 3/2013 |

(Continued)

OTHER PUBLICATIONS

Search Report and Written Opinion dated Mar. 7, 2017, issued by the International Searching Authority in counterpart International Application No. PCT/KR2016/012977 (PCT/ISA/237 and PCT/ISA/210).

*Primary Examiner* — Christopher S Kelley
*Assistant Examiner* — Kathleen M Walsh
(74) *Attorney, Agent, or Firm* — Sughrue Mion, PLLC

(57) ABSTRACT

Provided are methods and apparatuses for encoding and decoding video. The method of decoding video includes determining a type of an upper-layer data unit including a current coding unit in a hierarchical structure of a data unit; and obtaining, from a bitstream, intra-frame skip mode information of the current coding unit, according to the determined type of the upper-layer data unit, wherein, according to different types of the upper-layer data unit, the intra-frame skip mode information is expressed as code words having different lengths in the bitstream.

5 Claims, 2 Drawing Sheets

(51) Int. Cl.
*H04N 19/187* (2014.01)
*H04N 19/70* (2014.01)
*H04N 19/597* (2014.01)
*H04N 13/161* (2018.01)

(52) U.S. Cl.
CPC ......... *H04N 19/159* (2014.11); *H04N 19/187* (2014.11); *H04N 19/70* (2014.11)

(58) Field of Classification Search
CPC .... H04N 19/597; H04N 19/11; H04N 19/129; H04N 19/30; H04N 19/46
USPC .................................................. 375/240.13
See application file for complete search history.

(56) References Cited

U.S. PATENT DOCUMENTS

| | | | |
|---|---|---|---|
| 2013/0272411 A1* | 10/2013 | Tu | H04N 19/105 375/240.16 |
| 2014/0294061 A1 | 10/2014 | Zhang et al. | |
| 2016/0029040 A1 | 1/2016 | Deng et al. | |
| 2016/0080738 A1 | 3/2016 | Kim et al. | |
| 2016/0255345 A1* | 9/2016 | Liu | H04N 19/159 375/240.13 |

FOREIGN PATENT DOCUMENTS

| | | | |
|---|---|---|---|
| KR | 20130030240 A | * | 3/2013 |
| KR | 10-2015-0126713 A | | 11/2015 |
| WO | 2013/157822 A1 | | 10/2013 |

\* cited by examiner

METHOD AND DEVICE FOR ENCODING AND DECODING INTRA-FRAME SKIP MODE INFORMATION

TECHNICAL FIELD

The present disclosure relates to encoding and decoding video, and more particularly, to encoding and decoding information related to an intra-frame skip mode of a current coding unit.

BACKGROUND ART

In Three-Dimensional High Efficiency Video Coding (3D-HEVC), which is a recent international three-dimensional video coding specification, an intra-frame skip mode is used as a coding technology for depth image coding. This technology adopts an intra-frame prediction method. That is, pixels in a current pixel block are predicted by using reconstructed values of other pixels at positions that are spatially adjacent to the current pixel block. Since the current pixels to be predicted and the adjacent pixels used in prediction are in a same frame, this method is referred to as intra-frame prediction or intra prediction. After the intra-frame prediction is performed, a difference between a predicted value of a pixel and an original value of the pixel is calculated, according to a conventional intra-frame coding mode, and difference information and prediction method information are encoded into a video bitstream and are then transmitted to a decoder. Accordingly, the decoder performs intra-frame prediction by using the same prediction method to obtain the predicted value of the pixel, and adds the difference to the predicted value, thereby obtaining the reconstructed value of the pixel. However, in the intra-frame skip mode, after the intra-frame prediction is performed, the difference information is not transmitted. That is, the predicted value of the pixel is regarded as the final reconstructed value of the pixel. Because difference compensation is not performed, the reconstructed value may have a specific distortion compared to the original value before encoding, but coding compression efficiency is improved because the difference information is not required to be transmitted. In practice, there are many flat regions in the depth image. In the flat regions, a difference between the predicted value of the pixel obtained by the intra prediction and the original value of the pixel is very small. Thus, even if the difference information is not transmitted, the distortion of the reconstructed value is not large. Thus, this technology is adopted in 3D-HEVC to code the depth image.

In 3D-HEVC, an inter prediction mode and other intra prediction modes are still maintained with respect to coding the depth image. Thus, in 3D-HEVC, a flag is fixedly transmitted in the bitstream so as to indicate whether the intra-frame skip mode is used to encode the current pixel block, and in this regard, the flag is transmitted prior to other pieces of information. Thus, when the flag indicates that the intra-frame skip mode is used for the current pixel block, only the intra-frame prediction method used in prediction is subsequently transmitted, and none of the other pieces of information is transmitted. When the flag indicates that the intra-frame skip mode is not used for the current pixel block, other pieces of information, e.g., a prediction mode used for the current pixel block, a block partitioning method, motion information, a prediction direction, residual information, etc., are subsequently transmitted.

The method of indicating the intra-frame skip mode in 3D-HEVC is simple, but efficiency is low. This is because the flag in this method is fixedly transmitted, regardless of additional information and a type of a data unit including the current pixel block. In practice, in the video coding specification, coding modes supporting coding of a pixel block included in different types of data units are different. For example, the encoder can only select the intra-frame coding mode for an intra prediction encoding frame, and thus, a probability of selecting the intra-frame skip mode is high. The encoder may select the intra-frame prediction mode or the inter-frame prediction mode for an inter prediction encoding frame, and thus, the probability of selecting the intra-frame skip mode is decreased accordingly. Thus, efficiency of fixedly transmitting a 1-bit flag is low. For example, when an occurrence probability of the intra-frame skip mode is very low, in order to indicate whether the intra-frame skip mode is used, the 1-bit flag still has to be transmitted.

DESCRIPTION OF EMBODIMENTS

Technical Problem

The present disclosure provides a method and apparatus for encoding/decoding information related to an intra-frame skip mode of a current coding unit, based on a type of an upper-layer data unit including the current coding unit.

Advantageous Effects of Disclosure

By using a method and apparatus for encoding/decoding video according to embodiments, overhead may be reduced, and video coding compression efficiency may be improved.

BEST MODE

Figure 1:
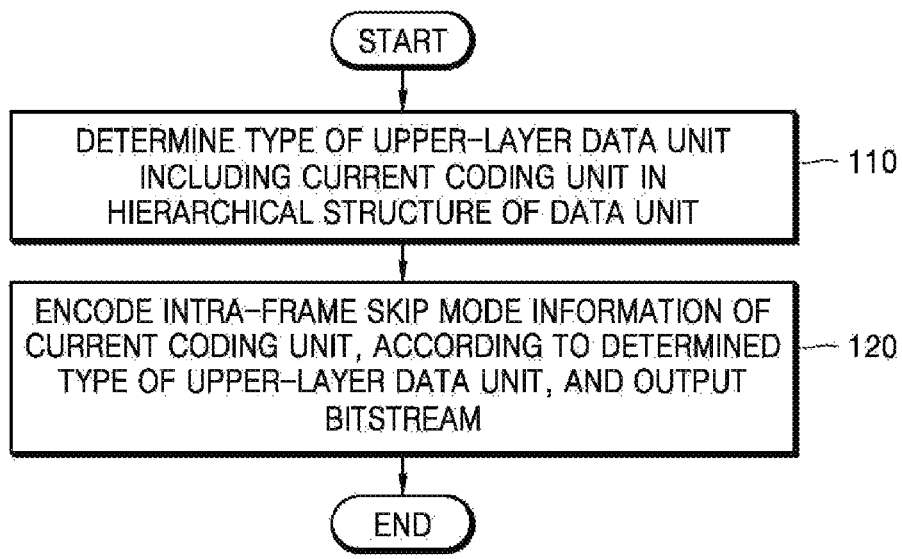
FIG. 1 illustrates a flowchart of a method of encoding video, according to an embodiment.

In accordance with an aspect of the disclosure, a method of decoding video includes determining a type of an upper-layer data unit including a current coding unit in a hierarchical structure of a data unit; and obtaining, from a bitstream, intra-frame skip mode information of the current coding unit, according to the determined type of the upper-layer data unit, wherein, according to different types of the upper-layer data unit, the intra-frame skip mode information is expressed as code words having different lengths in the bitstream.

The upper-layer data unit may be one of a sequence, a frame, a slice, a largest coding unit (LCU), a maximum coding block, and a coding unit.

The obtaining of the intra-frame skip mode information of the current coding unit may include obtaining a first syntax element when the determined type of the upper-layer data unit is a first type, and obtaining a second syntax element when the determined type of the upper-layer data unit is a second type, wherein the first syntax element is a 1-bit flag indicating whether an intra-frame skip mode is used for the current coding unit, and the second syntax element has an integer value between 0 and N, where N is equal to or greater than 3, to indicate use of the intra-frame skip mode and additional coding information with respect to the current coding unit.

The additional coding information may include at least one of an intra prediction method of the intra-frame skip mode when the intra-frame skip mode is used for the current coding unit, a prediction mode that is used for the current coding unit and is not the intra-frame skip mode, a partition mode of the current coding unit, and a direction of inter-frame prediction.

The upper-layer data unit may be a frame, the upper-layer data unit corresponding to the first type may be an intra prediction encoding frame, and the upper-layer data unit corresponding to the second type may be an inter prediction encoding frame.

The obtaining of the intra-frame skip mode information of the current coding unit may include obtaining a first syntax element when the determined type of the upper-layer data unit is a first type, and obtaining a second syntax element when the determined type of the upper-layer data unit is a second type, wherein the first syntax element has an integer value between 0 and N1 to indicate use of an intra-frame skip mode and additional coding information with respect to the current coding unit, and the second syntax element has an integer value between 0 and N2 to indicate use of the intra-frame skip mode and the additional coding information with respect to the current coding unit, wherein N1 and N2 are both equal to or greater than 3.

A value of the first syntax element indicating that the intra-frame skip mode is used for the current coding unit may be different from a value of the second syntax element indicating that the intra-frame skip mode is used for the current coding unit.

In accordance with another aspect of the disclosure, a video decoding apparatus includes a data unit type determiner configured to determine a type of an upper-layer data unit including a current coding unit in a hierarchical structure of a data unit; and an information obtaining unit configured to obtain, from a bitstream, intra-frame skip mode information of the current coding unit, according to the determined type of the upper-layer data unit, wherein, according to different types of the upper-layer data unit, the intra-frame skip mode information is expressed as code words having different lengths in the bitstream.

In accordance with another aspect of the disclosure, a method of encoding video includes determining a type of an upper-layer data unit including a current coding unit in a hierarchical structure of a data unit; and encoding intra-frame skip mode information of the current coding unit, according to the determined type of the upper-layer data unit, and outputting a bitstream, wherein, according to different types of the upper-layer data unit, the intra-frame skip mode information is expressed as code words having different lengths in the bitstream.

MODE OF DISCLOSURE

Hereinafter, in various embodiments described in the present specification, an 'image' may refer to not only a still image but may also comprehensively refer to a moving picture such as video. In addition, the 'image' may be a single-view image, a multiview image, a three-dimensional (3D) image including a texture image and a depth image, a multilayer image, a scalable image, or the like.

When various operations are performed on data related to the image, the data related to the image may be divided into data groups, and a same operation may be performed on data included in a same data group. Hereinafter, throughout the specification, a data group generated based on a preset criterion is referred to as a 'data unit'. Hereinafter, throughout the specification, an operation performed on every 'data unit' may mean that the operation is performed by using a plurality of items of data included in the data unit.

A hierarchical structure of a video data unit may include, from an upper layer to a lower layer, a sequence, a frame, a slice, a largest coding unit (LCU), a maximum coding block, a coding unit, a coding block, a prediction unit, and a prediction block. An upper-layer data unit may include one or more lower-layer data units. For example, the sequence may include one or more frames, the frame may include one or more slices, and the slice may include one or more LCUs that are arranged in a raster scan order. However, the hierarchical structure is not limited to the aforementioned example, and may have different forms.

According to a type of an upper-layer data unit to which a current coding unit belongs, a prediction mode of the current coding unit may be limited. For example, for a current coding unit included in an intra prediction encoding frame, only an intra prediction mode may be selected as a prediction mode of the current coding unit, and for an inter prediction encoding frame, an intra-frame prediction mode or an inter-frame prediction mode may be selected as a prediction mode.

When an intra-frame skip mode is used for a current coding unit, intra prediction is performed but residual information of the current coding unit is not encoded so that the residual information is not included in an output bitstream. Instead, information indicating whether the intra-frame skip mode is used, and information indicating which intra prediction method is used in the intra-frame skip mode may be encoded, and a single syntax element may indicate whether the intra-frame skip mode is used and which intra prediction method is used in the intra-frame skip mode.

In the present disclosure, a method of encoding video is provided.

According to an embodiment, a type of an upper-layer data unit including a current coding unit in a hierarchical structure of a data unit is determined, and according to the determined type of the upper-layer data unit, intra-frame skip mode information of the current coding unit is encoded to be output in a bitstream. According to different types of the upper-layer data unit, the intra-frame skip mode information may be expressed as code words having different lengths in the bitstream.

According to an embodiment, the upper-layer data unit may be one of a sequence, a frame, a slice, an LCU, a maximum coding block, and a coding unit. In a current coding unit, a coding unit may be substituted with an LCU, a maximum coding block, a coding block, a prediction unit, or a prediction block.

When the upper-layer data unit is a frame, the frame may be, according to its type, an intra prediction encoding frame, an inter prediction encoding frame, a uni-prediction encoding frame, a bi-prediction encoding frame, a dual-hypothesis encoding frame, a temporal prediction encoding frame, an inter-view prediction encoding frame, a base-view frame, a dependent-view frame, a texture frame, or a depth frame.

When the upper-layer data unit is a slice, the slice may be, according to its type, an intra prediction encoding slice, an inter prediction encoding slice, a uni-prediction encoding slice, a bi-prediction encoding slice, a dual-hypothesis encoding slice, a temporal prediction encoding slice, an inter-view prediction encoding slice, a base-view slice, a dependent-view slice, a texture slice, or a depth slice.

According to an embodiment, when types determined according to the upper-layer data unit including the current coding unit are different, information indicating an intra-frame skip mode with respect to the current coding unit may also vary. According to the types of the upper-layer data unit, information expressed as code words having different lengths in the bitstream may be encoded as the intra-frame skip mode information of the current coding unit.

According to an embodiment, when the determined type of the upper-layer data unit is a first type, a first syntax element may be encoded, and when the determined type of the upper-layer data unit is a second type, a second syntax element may be encoded. The first syntax element and the second syntax element may be expressed as code words having different lengths in the bitstream. For example, in the case where a probability that the upper-layer data unit including the current coding unit uses the intra-frame skip mode is high, the first syntax element may be expressed as a code word having a short length, such as a 1-bit flag, in the bitstream, and in the case where the probability that the upper-layer data unit including the current coding unit uses the intra-frame skip mode is low, the second syntax element may be expressed as a code word having a long length in the bitstream.

According to an embodiment, the upper-layer data unit may be a frame, the upper-layer data unit corresponding to the first type may be an intra prediction encoding frame, and the upper-layer data unit corresponding to the second type may be an inter prediction encoding frame.

According to an embodiment, the first syntax element may be a 1-bit flag indicating whether the intra-frame skip mode is used for the current coding unit, and the second syntax element may have an integer value between 0 and N (where N is equal to or greater than 3) to indicate use of the intra-frame skip mode and the additional coding information with respect to the current coding unit.

According to another embodiment, the first syntax element may have an integer value between 0 and N1 to indicate use of the intra-frame skip mode and additional coding information with respect to the current coding unit, and the second syntax element may have an integer value between 0 and N2 to indicate use of the intra-frame skip mode and the additional coding information with respect to the current coding unit, wherein N1 and N2 are both equal to or greater than 3.

According to an embodiment, the additional coding information may include at least one of an intra prediction method of the intra-frame skip mode in the case where the intra-frame skip mode is used in the current coding unit, a prediction mode that is used in the current coding unit and is not the intra-frame skip mode, and a direction of inter-frame prediction.

According to an embodiment, a value of the first syntax element indicating that the intra-frame skip mode is used in the current coding unit may be different from a value of the second syntax element indicating that the intra-frame skip mode is used in the current coding unit.

According to an embodiment, according to whether the intra-frame skip mode is used for the current coding unit, other pieces of information may be further encoded. When the intra-frame skip mode is used for the current coding unit, information indicating an intra prediction method used for the intra-frame skip mode may be encoded to be output in the bitstream. However, prediction residual information may not be encoded.

In the present disclosure, a method of decoding video is provided.

According to an embodiment, a type of an upper-layer data unit including a current coding unit in a hierarchical structure of a data unit is determined, and according to the determined type of the upper-layer data unit, intra-frame skip mode information of the current coding unit is obtained from a bitstream. According to different types of the upper-layer data unit, the intra-frame skip mode information may be expressed as code words having different lengths in the bitstream According to an embodiment, the upper-layer data unit may be one of a sequence, a frame, a slice, an LCU, a maximum coding block, and a coding unit. In a current coding unit, a coding unit may be substituted with an LCU, a maximum coding block, a coding block, a prediction unit, or a prediction block.

When the upper-layer data unit is a frame, the frame may be, according to its type, an intra prediction encoding frame, an inter prediction encoding frame, a uni-prediction encoding frame, a bi-prediction encoding frame, a dual-hypothesis encoding frame, a temporal prediction encoding frame, an inter-view prediction encoding frame, a base-view frame, a dependent-view frame, a texture frame, or a depth frame.

When the upper-layer data unit is a slice, the slice may be, according to its type, an intra prediction encoding slice, an inter prediction encoding slice, a uni-prediction encoding slice, a bi-prediction encoding slice, a dual-hypothesis encoding slice, a temporal prediction encoding slice, an inter-view prediction encoding slice, a base-view slice, a dependent-view slice, a texture slice, or a depth slice.

According to an embodiment, when types determined according to the upper-layer data unit including the current coding unit are different, information indicating an intra-frame skip mode with respect to the current coding unit may also vary. According to the types of the upper-layer data unit, information expressed as code words having different lengths in the bitstream may be obtained as the intra-frame skip mode information of the current coding unit.

According to an embodiment, when the determined type of the upper-layer data unit is a first type, a first syntax element may be obtained from the bitstream, and when the determined type of the upper-layer data unit is a second type, a second syntax element may be obtained from the bitstream. The first syntax element and the second syntax element may be expressed as code words having different lengths in the bitstream. For example, in the case where a probability that the upper-layer data unit including the current coding unit uses the intra-frame skip mode is high, the first syntax element may be expressed as a code word having a short length, such as a 1-bit flag, in the bitstream, and in the case where the probability that the upper-layer data unit including the current coding unit uses the intra-frame skip mode is low, the second syntax element may be expressed as a code word having a long length in the bitstream.

According to an embodiment, the upper-layer data unit may be a frame, the upper-layer data unit corresponding to the first type may be an intra prediction encoding frame, and the upper-layer data unit corresponding to the second type may be an inter prediction encoding frame.

According to an embodiment, the first syntax element may be a 1-bit flag indicating whether the intra-frame skip mode is used for the current coding unit, and the second syntax element may have an integer value between 0 and N (where N is equal to or greater than 3) to indicate use of the intra-frame skip mode and the additional coding information with respect to the current coding unit.

According to another embodiment, the first syntax element may have an integer value between 0 and N1 to indicate use of the intra-frame skip mode and additional coding information with respect to the current coding unit, and the second syntax element may have an integer value between 0 and N2 to indicate use of the intra-frame skip mode and the additional coding information with respect to the current coding unit, wherein N1 and N2 are both equal to or greater than 3.

According to an embodiment, the additional coding information may include at least one of an intra prediction method of the intra-frame skip mode in the case where the intra-frame skip mode is used in the current coding unit, a prediction mode that is used in the current coding unit and is not the intra-frame skip mode, and a direction of inter-frame prediction.

According to an embodiment, a value of the first syntax element indicating that the intra-frame skip mode is used in the current coding unit may be different from a value of the second syntax element indicating that the intra-frame skip mode is used in the current coding unit.

According to an embodiment, according to whether the intra-frame skip mode is used for the current coding unit, other pieces of information may be further obtained from the bitstream. When the intra-frame skip mode is used for the current coding unit, information indicating an intra prediction method used for the intra-frame skip mode may be obtained from the bitstream. However, prediction residual information may not be obtained. A pixel value predicted by performing, based on the determined prediction method, prediction on the current coding unit may be obtained, and the predicted pixel value may be regarded as a reconstructed pixel value.

In the present disclosure, a video encoding apparatus that corresponds to the method of encoding video is provided.

According to an embodiment, the video encoding apparatus includes a data unit type determiner configured to determine a type of an upper-layer data unit including a current coding unit in a hierarchical structure of a data unit, and an information encoder configured to encode intra-frame skip mode information of the current coding unit, according to the determined type of the upper-layer data unit, and to output a bitstream. According to different types of the upper-layer data unit, the intra-frame skip mode information may be expressed as code words having different lengths in the bitstream.

According to an embodiment, when types determined according to the upper-layer data unit including the current coding unit are different, information indicating an intra-frame skip mode with respect to the current coding unit may also vary. According to the types of the upper-layer data unit, the information encoder may encode information expressed as code words having different lengths in the bitstream, as the intra-frame skip mode information of the current coding unit.

According to an embodiment, when the determined type of the upper-layer data unit is a first type, the information encoder may encode a first syntax element, and when the determined type of the upper-layer data unit is a second type, the information encoder may encode a second syntax element. The first syntax element and the second syntax element may be expressed as code words having different lengths in the bitstream. For example, in the case where a probability that the upper-layer data unit including the current coding unit uses the intra-frame skip mode is high, the first syntax element may be expressed as a code word having a short length, such as a 1-bit flag, in the bitstream, and in the case where the probability that the upper-layer data unit including the current coding unit uses the intra-frame skip mode is low, the second syntax element may be expressed as a code word having a long length in the bitstream.

According to an embodiment, the first syntax element may be a 1-bit flag indicating whether the intra-frame skip mode is used for the current coding unit, and the second syntax element may have an integer value between 0 and N (where N is equal to or greater than 3) to indicate use of the intra-frame skip mode and the additional coding information with respect to the current coding unit.

According to another embodiment, the first syntax element may have an integer value between 0 and N1 to indicate use of the intra-frame skip mode and additional coding information with respect to the current coding unit, and the second syntax element may have an integer value between 0 and N2 to indicate use of the intra-frame skip mode and the additional coding information with respect to the current coding unit, wherein N1 and N2 are both equal to or greater than 3.

According to an embodiment, the additional coding information may include at least one of an intra prediction method of the intra-frame skip mode in the case where the intra-frame skip mode is used in the current coding unit, a prediction mode that is used in the current coding unit and is not the intra-frame skip mode, and a direction of inter-frame prediction.

According to an embodiment, a value of the first syntax element indicating that the intra-frame skip mode is used in the current coding unit may be different from a value of the second syntax element indicating that the intra-frame skip mode is used in the current coding unit.

According to an embodiment, according to whether the intra-frame skip mode is used for the current coding unit, the information encoder may further encode other pieces of information. When the intra-frame skip mode is used for the current coding unit, the information encoder may encode information indicating an intra prediction method used for the intra-frame skip mode and may output the bitstream. However, prediction residual information may not be encoded.

In the present disclosure, a video decoding apparatus that corresponds to the method of decoding video is provided.

According to an embodiment, the video decoding apparatus includes a data unit type determiner configured to determine a type of an upper-layer data unit including a current coding unit in a hierarchical structure of a data unit, and an information obtaining unit configured to obtain, from a bitstream, intra-frame skip mode information of the current coding unit, according to the determined type of the upper-layer data unit. According to different types of the upper-layer data unit, the intra-frame skip mode information may be expressed as code words having different lengths in the bitstream.

According to an embodiment, when types determined according to the upper-layer data unit including the current coding unit are different, information indicating an intra-frame skip mode with respect to the current coding unit may also vary. According to the types of the upper-layer data unit, the information obtaining unit may obtain information expressed as code words having different lengths in the bitstream, as the intra-frame skip mode information of the current coding unit.

According to an embodiment, when the determined type of the upper-layer data unit is a first type, the information obtaining unit may obtain a first syntax element, and when the determined type of the upper-layer data unit is a second type, the information obtaining unit may obtain a second syntax element. The first syntax element and the second syntax element may be expressed as code words having different lengths in the bitstream. For example, in the case where a probability that the upper-layer data unit including the current coding unit uses an intra-frame skip mode is high, the first syntax element may be expressed as a code word having a short length, such as a 1-bit flag, in the bitstream, and in the case where the probability that the upper-layer data unit including the current coding unit uses the intra-frame skip mode is low, the second syntax element may be expressed as a code word having a long length in the bitstream.

According to an embodiment, the first syntax element may be a 1-bit flag indicating whether the intra-frame skip mode is used for the current coding unit, and the second syntax element may have an integer value between 0 and N (where N is equal to or greater than 3) to indicate use of the intra-frame skip mode and the additional coding information with respect to the current coding unit.

According to another embodiment, the first syntax element may have an integer value between 0 and N1 to indicate use of the intra-frame skip mode and additional coding information with respect to the current coding unit, and the second syntax element may have an integer value between 0 and N2 to indicate use of the intra-frame skip mode and the additional coding information with respect to the current coding unit, wherein N1 and N2 are both equal to or greater than 3.

According to an embodiment, the additional coding information may include at least one of an intra prediction method of the intra-frame skip mode in the case where the intra-frame skip mode is used in the current coding unit, a prediction mode that is used in the current coding unit and is not the intra-frame skip mode, and a direction of inter-frame prediction.

According to an embodiment, a value of the first syntax element indicating that the intra-frame skip mode is used in the current coding unit may be different from a value of the second syntax element indicating that the intra-frame skip mode is used in the current coding unit.

According to an embodiment, according to whether the intra-frame skip mode is used for the current coding unit, the information obtaining unit may further obtain other pieces of information. When the intra-frame skip mode is used for the current coding unit, the information obtaining unit may obtain information indicating an intra prediction method used for the intra-frame skip mode. However, prediction residual information may not be obtained.

Hereinafter, various embodiments will be described in detail with reference to the accompanying drawings.

FIG. 1 illustrates a flowchart of a method of encoding video, according to an embodiment.

Referring to FIG. 1, the method of encoding video includes operation 110 of determining a type of an upper-layer data unit including a current coding unit in a hierarchical structure of a data unit, and operation 120 of encoding intra-frame skip mode information of the current coding unit, according to the determined type of the upper-layer data unit, and outputting a bitstream.

Hereinafter, with reference to FIG. 1, encoding methods of embodiments 1 through 4 will now be described.

According to the embodiment 1, in operation 110, a type of an upper-layer data unit including a current coding unit in a hierarchical structure of a data unit is determined.

In the present embodiment, the upper-layer data unit is a frame, and the type of the frame including the current coding unit is determined in operation 110. The frame may be, according to its type, an intra prediction encoding frame, an inter prediction encoding frame, a uni-prediction encoding frame, a bi-prediction encoding frame, a dual-hypothesis encoding frame, a temporal prediction encoding frame, an inter-view prediction encoding frame, a base-view frame, a dependent-view frame, a texture frame, or a depth frame.

In operation 120, according to the determined type of the upper-layer data unit, intra-frame skip mode information of the current coding unit is encoded to be output in a bitstream.

The intra-frame skip mode information is encoded according to the type of the frame including the current coding unit, the type being determined in operation 110, and is included in the bitstream to be output.

When the frame including the current coding unit is an intra-prediction encoding frame, a flag may be signalled into the bitstream so as to indicate whether an intra-frame skip mode is used for the current coding unit. For example, when the intra-frame skip mode is used for the current coding unit, a value of 1 for the flag may be generated, when the intra-frame skip mode is not used for the current coding unit, a value of 0 for the flag may be generated, and the generated value may be recorded to the bitstream.

When the frame including the current coding unit is an inter-prediction encoding frame, a syntax element may be signalled into the bitstream so as to indicate whether the intra-frame skip mode is used for the current coding unit and to indicate additional coding information.

For example, a value of 0 for the syntax element may be generated when an inter-frame skip mode is used for the current coding unit, a value of 1 for the syntax element may be generated when an inter-frame direct mode is used for the current coding unit, a value of 2 for the syntax element may be generated when the intra-frame skip mode is used for the current coding unit, a value of 3, 4, or 5 for the syntax element may be generated according to a method of partitioning the current coding unit when another inter-frame prediction mode is used for the current coding unit, or a value of 6 for the syntax element may be generated when an intra-frame prediction mode (except for the intra-frame skip mode) is used for the current coding unit, and the generated value may be recorded to the bitstream.

When the intra-frame skip mode is used for the current coding unit, information about a prediction method used for the intra-frame skip mode may be further signaled into the bitstream. For example, a value of 0 may be generated when a first prediction method is used as the prediction method used for the intra-frame skip mode, a value of 1 may be generated when a second prediction method is used as the prediction method used for the intra-frame skip mode, a value of 2 may be generated when a third prediction method is used as the prediction method used for the intra-frame skip mode, or a value of 3 may be generated when a fourth prediction method is used as the prediction method used for the intra-frame skip mode, and the generated value may be recorded to the bitstream.

When the intra-frame skip mode is used for the current coding unit, prediction residual information may not be included in the bitstream.

In the present embodiment, the frame may be substituted with a sequence, a slice, an LCU, a maximum coding block, or, a coding unit. In the current coding unit, a coding unit may be substituted with an LCU, a maximum coding block, a coding block, a prediction unit, or a prediction block.

According to the embodiment 2, in operation 110, a type of an upper-layer data unit including a current coding unit in a hierarchical structure of a data unit is determined.

In the present embodiment, the upper-layer data unit is a slice, and the type of the slice including the current coding unit is determined in operation 110. The slice may be, according to its type, an intra prediction encoding slice, an inter prediction encoding slice, a uni-prediction encoding slice, a bi-prediction encoding slice, a dual-hypothesis encoding slice, a temporal prediction encoding slice, an inter-view prediction encoding slice, a base-view slice, a dependent-view slice, a texture slice, or a depth slice.

In operation 120, according to the determined type of the upper-layer data unit, intra-frame skip mode information of the current coding unit is encoded to be output in a bitstream.

The intra-frame skip mode information is encoded according to the type of the slice including the current coding unit, the type being determined in operation 110, and is included in the bitstream to be output.

When the slice including the current coding unit is a category-A slice, a flag may be signalled into the bitstream so as to indicate whether an intra-frame skip mode is used for the current coding unit. For example, when the intra-frame skip mode is used for the current coding unit, a value of 1 for the flag may be generated, or when the intra-frame skip mode is not used for the current coding unit, a value of 0 for the flag may be generated, and the generated value may be recorded to the bitstream.

When the slice including the current coding unit is a category-B slice or a category-C slice, a syntax element may be signalled into the bitstream so as to indicate whether the intra-frame skip mode is used for the current coding unit and to indicate additional coding information.

For example, for the category-B slice, a value of 0 for the syntax element may be generated when a mode x is used for the current coding unit, a value of 1 for the syntax element may be generated when the intra-frame skip mode is used for the current coding unit, a value of 2 for the syntax element may be generated when a mode y is used for the current coding unit, a value of 3 for the syntax element may be generated when a mode z is used for the current coding unit. A value of 3, 4, or 5 for the syntax element may be generated according to different conditions when a mode z is used for the current coding unit. A different value for the syntax element may be generated when a different prediction mode is used for the current coding unit, and the generated value may be recorded to the bitstream.

For the category-C slice, a value of 0 for the syntax element may be generated when the intra-frame skip mode is used for the current coding unit, a value of 1 for the syntax element may be generated when a mode x is used for the current coding unit. A value of 1, 2, . . . , or k−1 for the syntax element may be generated according to different conditions when a mode x is used for the current coding unit. A value of 2 (when the value of 1 has been generated for the mode x) or a value of k (when the value of 1, 2, . . . , or k−1 has been generated for the mode x) for the syntax element may be generated when a mode y is used for the current coding unit, and a different value for the syntax element may be generated when a different prediction mode is used for the current coding unit, and the generated value may be recorded to the bitstream.

The modes x, y, and z may be different prediction modes except for the intra-frame skip mode.

When the intra-frame skip mode is used for the current coding unit, information about a prediction method used for the intra-frame skip mode may be further signaled into the bitstream.

For example, a value of 0 may be generated when a first prediction method is used as the prediction method used for the intra-frame skip mode, a value of 1 may be generated when a second prediction method is used as the prediction method used for the intra-frame skip mode, a value of 2 may be generated when a third prediction method is used as the prediction method used for the intra-frame skip mode, or a value of 3 may be generated when a fourth prediction method is used as the prediction method used for the intra-frame skip mode, and the generated value for the syntax element may be recorded to the bitstream.

When the intra-frame skip mode is used for the current coding unit, prediction residual information may not be included in the bitstream.

In the present embodiment, the slice may be substituted with a sequence, a frame, an LCU, a maximum coding block, or a coding unit. In the current coding unit, a coding unit may be substituted with an LCU, a maximum coding block, a coding block, a prediction unit, or a prediction block.

According to the embodiment 3, in operation 110, a type of an upper-layer data unit including a current coding unit in a hierarchical structure of a data unit is determined.

In the present embodiment, the upper-layer data unit is a frame, and the type of the frame including the current coding unit is determined in operation 110. The frame may be, according to its type, an intra prediction encoding frame, an inter prediction encoding frame, a uni-prediction encoding frame, a bi-prediction encoding frame, a dual-hypothesis encoding frame, a temporal prediction encoding frame, an inter-view prediction encoding frame, a base-view frame, a dependent-view frame, a texture frame, or a depth frame.

In operation 120, according to the determined type of the upper-layer data unit, intra-frame skip mode information of the current coding unit is encoded to be output in a bitstream.

The intra-frame skip mode information is encoded according to the type of the frame including the current coding unit, the type being determined in operation 110, and is included in the bitstream to be output.

When the frame including the current coding unit is a category-A frame, a syntax element may be signalled into the bitstream so as to indicate whether an intra-frame skip mode is used for the current coding unit and to indicate additional coding information. A value of x for the syntax element may be generated when the intra-frame skip mode is used for the current coding unit, and otherwise, a different value for the syntax element may be generated based on the additional coding information, and the generated value for the syntax element may be recorded to the bitstream. When the frame including the current coding unit is a category-B frame, the syntax element may be signalled into the bitstream so as to indicate whether the intra-frame skip mode is used for the current coding unit and to indicate additional coding information. A value of y for the syntax element may be generated when the intra-frame skip mode is used for the current coding unit, and otherwise, a different value for the syntax element may be generated based on the additional coding information, and the generated value for the syntax element may be recorded to the bitstream. In this regard, the values of x and y may be different from each other.

When the intra-frame skip mode is used for the current coding unit, information about a prediction method used for the intra-frame skip mode may be further signaled into the bitstream. For example, a value of 0 may be generated when a first prediction method is used as the prediction method used for the intra-frame skip mode, a value of 1 may be generated when a second prediction method is used as the prediction method used for the intra-frame skip mode, a value of 2 may be generated when a third prediction method is used as the prediction method used for the intra-frame skip mode, or a value of 3 may be generated when a fourth prediction method is used as the prediction method used for the intra-frame skip mode, and the generated value for the syntax element may be recorded to the bitstream.

When the intra-frame skip mode is used for the current coding unit, prediction residual information may not be included in the bitstream.

In the present embodiment, the frame may be substituted with a sequence, a slice, an LCU, a maximum coding block, or a coding unit. In the current coding unit, a coding unit may be substituted with an LCU, a maximum coding block, a coding block, a prediction unit, or a prediction block.

According to the embodiment 4, in operation 110, a type of an upper-layer data unit including a current coding unit in a hierarchical structure of a data unit is determined.

In the present embodiment, the upper-layer data unit is a frame, and the type of the frame including the current coding unit is determined in operation 110. The frame may be, according to its type, an intra prediction encoding frame, an inter prediction encoding frame, a uni-prediction encoding frame, a bi-prediction encoding frame, a dual-hypothesis encoding frame, a temporal prediction encoding frame, an inter-view prediction encoding frame, a base-view frame, a dependent-view frame, a texture frame, or a depth frame.

In operation 120, according to the determined type of the upper-layer data unit, intra-frame skip mode information of the current coding unit is encoded to be output in a bitstream.

The intra-frame skip mode information is encoded according to the type of the frame including the current coding unit, the type being determined in operation 110, and is included in the bitstream to be output.

When the frame including the current coding unit is a category-A frame, a syntax element may be signalled into the bitstream so as to indicate whether an intra-frame skip mode is used for the current coding unit and to indicate additional coding information. When the intra-frame skip mode is used for the current coding unit, a value of the syntax element which is dependent on a prediction method used with respect to the intra-frame skip mode may be generated. For example, a value of $x_a$ for the syntax element may be generated when a first prediction method is used, a value of $x_b$ for the syntax element may be generated when a second prediction method is used, or a value of $x_c$ for the syntax element may be generated when a third prediction method is used, and the generated value for the syntax element may be recorded to the bitstream. When the intra-frame skip mode is not used for the current coding unit, a different value for the syntax element may be generated based on the additional coding information.

When the frame including the current coding unit is a category-B frame, the syntax element may be signalled into the bitstream so as to indicate whether the intra-frame skip mode is used for the current coding unit and to indicate additional coding information. When the intra-frame skip mode is used for the current coding unit, a value of the syntax element which is dependent on a prediction method used with respect to the intra-frame skip mode may be generated. For example, a value of $y_a$ may be generated when a first prediction method is used, a value of $y_b$ may be generated when a second prediction method is used, or a value of $y_c$ may be generated when a third prediction method is used, and the generated value for the syntax element may be recorded to the bitstream. When the intra-frame skip mode is not used for the current coding unit, a different value may be generated based on the additional coding information.

In this regard, the values of $x_a$ and $y_a$ may be different from each other, the values of $x_b$ and $y_b$ may be different from each other, and the values of $x_c$ and $y_c$ may be different from each other.

When the intra-frame skip mode is used for the current coding unit, prediction residual information may not be included in the bitstream.

In the present embodiment, the frame may be substituted with a sequence, a slice, an LCU, a maximum coding block, or a coding unit. In the current coding unit, a coding unit may be substituted with an LCU, a maximum coding block, a coding block, a prediction unit, or a prediction block.

Figure 2:
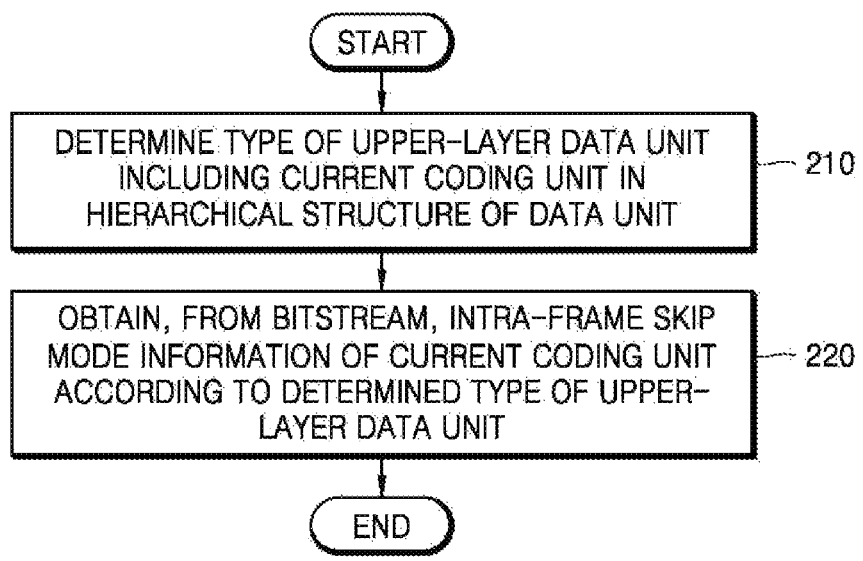
FIG. 2 illustrates a flowchart of a method of decoding video, according to an embodiment.

FIG. 2 illustrates a flowchart of a method of decoding video, according to an embodiment.

Referring to FIG. 2, the method of decoding video includes operation 210 of determining a type of an upper-layer data unit including a current coding unit in a hierarchical structure of a data unit, and operation 220 of obtaining, from a bitstream, intra-frame skip mode information of the current coding unit according to the determined type of the upper-layer data unit.

Hereinafter, with reference to FIG. 2, decoding methods of embodiments 5 through 8 will now be described.

According to the embodiment 5, in operation 210, a type of an upper-layer data unit including a current coding unit in a hierarchical structure of a data unit is determined.

In the present embodiment, the upper-layer data unit is a frame, and the type of the frame including the current coding unit is determined in operation 210. The frame may be, according to its type, an intra prediction encoding frame, an inter prediction encoding frame, a uni-prediction encoding frame, a bi-prediction encoding frame, a dual-hypothesis encoding frame, a temporal prediction encoding frame, an inter-view prediction encoding frame, a base-view frame, a dependent-view frame, a texture frame, or a depth frame.

In operation 220, according to the determined type of the upper-layer data unit, intra-frame skip mode information of the current coding unit is obtained from a bitstream.

The intra-frame skip mode information of the current coding unit is obtained from the bitstream, according to the type of the frame determined in operation 210.

When the frame including the current coding unit is an intra-prediction encoding frame, a flag may be parsed from the bitstream, the flag indicating whether an intra-frame skip mode is used for the current coding unit. For example, when a value of the parsed flag is 1, it is determined that the intra-frame skip mode is used for the current coding unit, and when the value of the parsed flag is 0, it is determined that the intra-frame skip mode is not used for the current coding unit.

When the frame including the current coding unit is an inter-prediction encoding frame, a syntax element that indicates whether the intra-frame skip mode is used for the current coding unit and indicates additional coding information may be parsed from the bitstream. For example, when a value of the parsed syntax element is 0, it is determined that an inter-frame skip mode is used for the current coding unit, when the value of the parsed syntax element is 1, it is determined that an inter-frame direct mode is used for the current coding unit, when the value of the parsed syntax element is 2, it is determined that the intra-frame skip mode is used for the current coding unit, when the value of the parsed syntax element is 3, 4, or 5, it is determined that a different inter-frame prediction mode is used for the current coding unit and a partitioning method is determined with respect to the current coding unit based on the parsed value, or when the value of the parsed syntax element is 6, an intra-frame prediction mode (except for the intra-frame skip mode) is determined with respect to the current coding unit.

When it is determined that the intra-frame skip mode is used for the current coding unit, information about a prediction method used for the intra-frame skip mode may be further parsed from the bitstream. For example, when a value parsed from the bitstream is 0, a first prediction method is used as the prediction method for the intra-frame skip mode with respect to the current coding unit, when the value parsed from the bitstream is 1, a second prediction method is used as the prediction method for the intra-frame skip mode with respect to the current coding unit, when the value parsed from the bitstream is 2, a third prediction method is used as the prediction method for the intra-frame skip mode with respect to the current coding unit, or when the value parsed from the bitstream is 3, a fourth prediction method is used as the prediction method for the intra-frame skip mode with respect to the current coding unit.

When the intra-frame skip mode is used for the current coding unit, prediction residual information may not be parsed from the bitstream. Prediction may be performed on the current coding unit according to the determined prediction method so as to obtain a predicted pixel value, and the predicted pixel value may be regarded as a reconstructed pixel value.

In the present embodiment, the frame may be substituted with a sequence, a slice, an LCU, a maximum coding block, or a coding unit. In the current coding unit, a coding unit may be substituted with an LCU, a maximum coding block, a coding block, a prediction unit, or a prediction block.

According to the embodiment 6, in operation 210, a type of an upper-layer data unit including a current coding unit in a hierarchical structure of a data unit is determined.

In the present embodiment, the upper-layer data unit is a slice, and the type of the slice including the current coding unit is determined in operation 210. The slice may be, according to its type, an intra prediction encoding slice, an inter prediction encoding slice, a uni-prediction encoding slice, a bi-prediction encoding slice, a dual-hypothesis encoding slice, a temporal prediction encoding slice, an inter-view prediction encoding slice, a base-view slice, a dependent-view slice, a texture slice, or a depth slice.

In operation 220, according to the determined type of the upper-layer data unit, intra-frame skip mode information of the current coding unit is obtained from a bitstream.

The intra-frame skip mode information of the current coding unit is obtained from the bitstream, according to the type of the slice determined in operation 210.

When the slice including the current coding unit is a category-A slice, a flag may be parsed from the bitstream, the flag indicating whether an intra-frame skip mode is used for the current coding unit. For example, when a value of the parsed flag is 1, it is determined that the intra-frame skip mode is used for the current coding unit, and when the value of the parsed flag is 0, it is determined that the intra-frame skip mode is not used for the current coding unit.

When the slice including the current coding unit is a category-B slice or a category-C slice, a syntax element that indicates whether the intra-frame skip mode is used for the current coding unit and indicates additional coding information may be parsed from the bitstream.

For example, with respect to the category-B slice, when a value of the parsed syntax element is 0, it is determined that a mode x is used for the current coding unit, when the value of the parsed syntax element is 1, it is determined that the intra-frame skip mode is used for the current coding unit, when the value of the parsed syntax element is 2, it is determined that a mode y is used for the current coding unit, when the value of the parsed syntax element is 3, it is determined that a mode z is used for the current coding unit, or when the value of the parsed syntax element is 3, 4, or 5, it is determined that a mode z is used for the current coding unit, and the additional coding information based on the value of the syntax element is determined.

With respect to the category-C slice, when a value of the parsed syntax element is 0, it is determined that the intra-frame skip mode is used for the current coding unit, when the value of the parsed syntax element is 1, it is determined that a mode x is used for the current coding unit, when the value of the parsed syntax element is 1, 2, . . . or k−1, it is determined that the mode x is used for the current coding unit and the additional coding information is simultaneously determined, when the value of the parsed syntax element is 2 (only when 1 as the value of the parsed syntax element indicates the mode x) or k (when 1, 2, . . . or k−1 as the value of the parsed syntax element indicates the mode x), it is determined that a mode y is used for the current coding unit. When the value of the parsed syntax element is a value different from the aforementioned values, it is determined that a different prediction mode is used for the current coding unit.

The modes x, y, and z may be different modes other than the intra-frame skip mode.

When it is determined that the intra-frame skip mode is used for the current coding unit, information about a prediction method used for the intra-frame skip mode may be further parsed from the bitstream. For example, when a value parsed from the bitstream is 0, a first prediction method is used as the prediction method for the intra-frame skip mode with respect to the current coding unit, when the value parsed from the bitstream is 1, a second prediction method is used as the prediction method for the intra-frame skip mode with respect to the current coding unit, when the value parsed from the bitstream is 2, a third prediction method is used as the prediction method for the intra-frame skip mode with respect to the current coding unit, or when the value parsed from the bitstream is 3, a fourth prediction method is used as the prediction method for the intra-frame skip mode with respect to the current coding unit.

When the intra-frame skip mode is used for the current coding unit, prediction residual information may not be parsed from the bitstream. Prediction may be performed on the current coding unit according to the determined prediction method so as to obtain a predicted pixel value, and the predicted pixel value may be regarded as a reconstructed pixel value.

In the present embodiment, the slice may be substituted with a sequence, a frame, an LCU, a maximum coding block, or a coding unit. In the current coding unit, a coding unit may be substituted with an LCU, a maximum coding block, a coding block, a prediction unit, or a prediction block.

According to the embodiment 7, in operation 210, a type of an upper-layer data unit including a current coding unit in a hierarchical structure of a data unit is determined.

In the present embodiment, the upper-layer data unit is a frame, and the type of the frame including the current coding unit is determined in operation 210. The frame may be, according to its type, an intra prediction encoding frame, an inter prediction encoding frame, a uni-prediction encoding frame, a bi-prediction encoding frame, a dual-hypothesis encoding frame, a temporal prediction encoding frame, an inter-view prediction encoding frame, a base-view frame, a dependent-view frame, a texture frame, or a depth frame.

In operation 220, according to the determined type of the upper-layer data unit, intra-frame skip mode information of the current coding unit is obtained from a bitstream.

The intra-frame skip mode information of the current coding unit is obtained from the bitstream, according to the type of the frame determined in operation 210.

When the frame including the current coding unit is a category-A frame, a syntax element that indicates whether the intra-frame skip mode is used for the current coding unit and indicates additional coding information may be parsed from the bitstream. When a value of the parsed syntax element is x, it is determined that the intra-frame skip mode is used for the current coding unit. Otherwise, it is determined that that the intra-frame skip mode is not used for the current coding unit, and simultaneously, additional information is determined based on the value of the syntax element.

When the frame including the current coding unit is a category-B frame, a syntax element that indicates whether the intra-frame skip mode is used for the current coding unit and indicates additional coding information may be parsed from the bitstream. When a value of the parsed syntax element is y, it is determined that the intra-frame skip mode is used for the current coding unit. Otherwise, it is determined that that the intra-frame skip mode is not used for the current coding unit, and simultaneously, additional information is determined based on the value of the syntax element. In this regard, the values of x and y may be different from each other.

When it is determined that the intra-frame skip mode is used for the current coding unit, information about a prediction method used for the intra-frame skip mode may be further parsed from the bitstream. For example, when a value parsed from the bitstream is 0, a first prediction method is used as the prediction method for the intra-frame skip mode with respect to the current coding unit, when the value parsed from the bitstream is 1, a second prediction method is used as the prediction method for the intra-frame skip mode with respect to the current coding unit, when the value parsed from the bitstream is 2, a third prediction method is used as the prediction method for the intra-frame skip mode with respect to the current coding unit, or when the value parsed from the bitstream is 3, a fourth prediction method is used as the prediction method for the intra-frame skip mode with respect to the current coding unit.

When the intra-frame skip mode is used for the current coding unit, prediction residual information may not be parsed from the bitstream. Prediction may be performed on the current coding unit according to the determined prediction method so as to obtain a predicted pixel value, and the predicted pixel value may be regarded as a reconstructed pixel value.

In the present embodiment, the frame may be substituted with a sequence, a slice, an LCU, a maximum coding block, or a coding unit. In the current coding unit, a coding unit may be substituted with an LCU, a maximum coding block, a coding block, a prediction unit, or a prediction block.

According to the embodiment 8, in operation 210, a type of an upper-layer data unit including a current coding unit in a hierarchical structure of a data unit is determined.

In the present embodiment, the upper-layer data unit is a frame, and the type of the frame including the current coding unit is determined in operation 210. The frame may be, according to its type, an intra prediction encoding frame, an inter prediction encoding frame, a uni-prediction encoding frame, a bi-prediction encoding frame, a dual-hypothesis encoding frame, a temporal prediction encoding frame, an inter-view prediction encoding frame, a base-view frame, a dependent-view frame, a texture frame, or a depth frame.

In operation 220, according to the determined type of the upper-layer data unit, intra-frame skip mode information of the current coding unit is obtained from a bitstream.

The intra-frame skip mode information of the current coding unit is obtained from the bitstream, according to the type of the frame determined in operation 210.

When the frame including the current coding unit is a category-A frame, a syntax element that indicates whether the intra-frame skip mode is used for the current coding unit and indicates additional coding information is parsed from the bitstream. When a value of the parsed syntax element is $x_a$, $x_b$, or $x_c$, it is determined that the intra-frame skip mode is used for the current coding unit. Otherwise, it is determined that the intra-frame skip mode is not used for the current coding unit, and additional information is determined based on the value of the parsed syntax element. When the intra-frame skip mode is used for the current coding unit, a prediction method used for the intra-frame skip mode is also determined. For example, when the value of the parsed syntax element is $x_a$, it is determined that a first prediction method is used for the intra-frame skip mode, when the value of the parsed syntax element is $x_b$, it is determined that a second prediction method is used for the intra-frame skip mode, or when the value of the parsed syntax element is xc, it is determined that a third prediction method is used for the intra-frame skip mode.

When the frame including the current coding unit is a category-B frame, a syntax element that indicates whether the intra-frame skip mode is used for the current coding unit and indicates additional coding information is parsed from the bitstream. When a value of the parsed syntax element is $y_a$, $y_b$, or $y_c$, it is determined that the intra-frame skip mode is used for the current coding unit. Otherwise, it is determined that the intra-frame skip mode is not used for the current coding unit, and additional information is also determined based on the value of the parsed syntax element. When the intra-frame skip mode is used for the current coding unit, a prediction method used for the intra-frame skip mode is also determined.

In particular, when the value of the parsed syntax element is $y_a$, it is determined that a first prediction method is used for the intra-frame skip mode, when the value of the parsed syntax element is $y_b$, it is determined that a second prediction method is used for the intra-frame skip mode, or when the value of the parsed syntax element is $y_c$, it is determined that a third prediction method is used for the intra-frame skip mode. In this regard, the values of $x_a$ and $y_a$ may be different from each other, the values of $x_b$ and $y_b$ may be different from each other, and the values of $x_c$ and $y_c$ may be different from each other.

When the intra-frame skip mode is used for the current coding unit, prediction residual information may not be parsed from the bitstream. Prediction may be performed on the current coding unit according to the determined prediction method so as to obtain a predicted pixel value, and the predicted pixel value may be regarded as a reconstructed pixel value.

In the present embodiment, the frame may be substituted with a sequence, a slice, an LCU, a maximum coding block, or a coding unit. In the current coding unit, a coding unit may be substituted with an LCU, a maximum coding block, a coding block, a prediction unit, or a prediction block.

Figure 3:
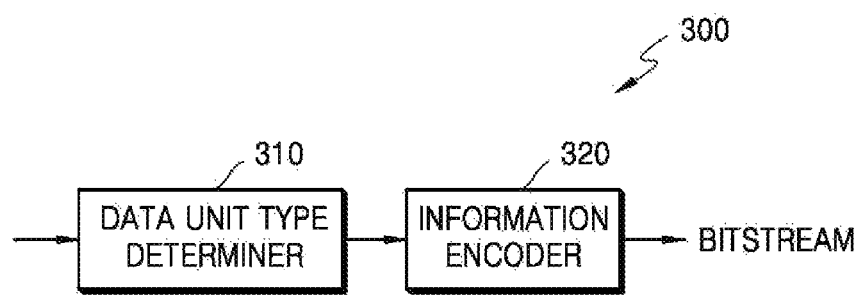
FIG. 3 is a block diagram of a video encoding apparatus, according to an embodiment.

FIG. 3 is a block diagram of a video encoding apparatus, according to an embodiment.

As illustrated in FIG. 3, a video encoding apparatus 300 includes a data unit type determiner 310 configured to determine a type of an upper-layer data unit including a current coding unit in a hierarchical structure of a data unit, and an information encoder 320 configured to encode intra-frame skip mode information of the current coding unit, according to the determined type of the upper-layer data unit, and to output a bitstream.

Hereinafter, with reference to FIG. 3, the video encoding apparatus of an embodiment 9 will now be described.

In the embodiment 9, the video encoding apparatus 300 includes the data unit type determiner 310 and the information encoder 320.

The data unit type determiner 310 may determine a type of the upper-layer data unit including a current coding unit in the hierarchical structure of the data unit, and in this regard, the upper-layer data unit may be one of a sequence, a frame, a slice, an LCU, a maximum coding block, and a coding unit.

The information encoder 320 encodes intra-frame skip mode information of the current coding unit, according to the type of the upper-layer data unit which is determined by the data unit type determiner 310, and outputs a bitstream. In particular, the information encoder 320 may perform processes of operation 120 of the embodiments 1 through 4 but is not limited thereto.

When an intra-frame skip mode is used for the current coding unit, prediction residual information may not be included in the bitstream.

Figure 4:
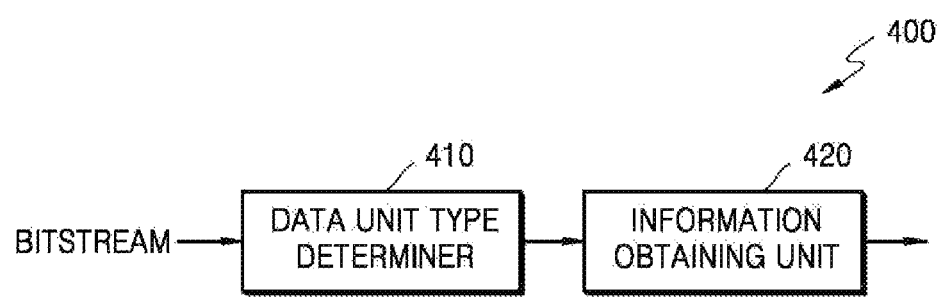
FIG. 4 is a block diagram of a video decoding apparatus, according to an embodiment.

FIG. 4 is a block diagram of a video decoding apparatus, according to an embodiment.

As illustrated in FIG. 4, a video decoding apparatus 400 includes a data unit type determiner 410 configured to determine a type of an upper-layer data unit including a current coding unit in a hierarchical structure of a data unit, and an information obtaining unit 420 configured to obtain, from a bitstream, intra-frame skip mode information of the current coding unit, according to the determined type of the upper-layer data unit.

Hereinafter, with reference to FIG. 4, the video decoding apparatus of an embodiment 10 will now be described.

In the embodiment 10, the video decoding apparatus 400 includes the data unit type determiner 410 and the information obtaining unit 420.

The data unit type determiner 410 may determine a type of the upper-layer data unit including a current coding unit in the hierarchical structure of the data unit, and in this regard, the upper-layer data unit may be one of a sequence, a frame, a slice, an LCU, a maximum coding block, and a coding unit.

The information obtaining unit 420 parses, from the bitstream, the intra-frame skip mode information of the current coding unit, according to the type of the upper-layer data unit including the current coding unit, the type being provided by the data unit type determiner 410. In particular, the information obtaining unit 420 may perform processes of operation 220 of the embodiments 5 through 8 but is not limited thereto.

When an intra-frame skip mode is used for the current coding unit, prediction residual information may not be parsed from the bitstream. Prediction may be performed on the current coding unit according to the determined prediction method so as to obtain a predicted pixel value, and the predicted pixel value may be regarded as a reconstructed pixel value.

The descriptions merely correspond to exemplary embodiments and do not limit the scope of the disclosure. All revisions, equivalents, or substitutions which are within the concept and the principles of the disclosure are included in the scope related to the disclosure.

The invention claimed is:

1. A method of decoding video, the method comprising:
   identifying a type of a current frame comprising a current coding unit in a hierarchical structure of a data unit;
   obtaining, from a bitstream, a 1-bit flag indicating whether an intra-frame skip mode is used for the current coding unit when the identified type of the current frame is an intra prediction encoding frame;
   obtaining, from the bitstream, a syntax element having an integer value to indicate use of the intra-frame skip mode and additional coding information with respect to the current coding unit when the identified type of the current frame is an inter prediction encoding frame;
   when a prediction mode of the current coding unit is the intra-frame skip mode, performing intra-prediction on the current coding unit to obtain a prediction pixel value; and
   identifying the prediction pixel value as a reconstructed pixel value without parsing residual information from the bitstream.

2. The method of claim 1, wherein the additional coding information comprises at least one of an intra prediction method of the intra-frame skip mode when the intra-frame skip mode is used for the current coding unit, a prediction mode that is used for the current coding unit and is not the intra-frame skip mode, a partition mode of the current coding unit, or a direction of inter-frame prediction.

3. A video decoding apparatus comprising:
   a processor configured to:
      identify a type of a current frame comprising a current coding unit in a hierarchical structure of a data unit;
      obtain, from a bitstream, a 1-bit flag indicating whether an intra-frame skip mode is used for the current coding unit when the identified type of the current frame is an intra prediction encoding frame;
      obtain, from the bitstream, a syntax element having an integer value to indicate use of the intra-frame skip mode and additional coding information with respect to the current coding unit when the identified type of the current frame is an inter prediction encoding frame;
      perform intra-prediction on the current coding unit to obtain a prediction pixel value when a prediction mode of the current coding unit is the intra-frame skip mode; and
      identify the prediction pixel value as a reconstructed pixel value without parsing residual information from the bitstream.

4. The video decoding apparatus of claim 3, wherein the additional coding information comprises at least one of an intra prediction method of the intra-frame skip mode when the intra-frame skip mode is used for the current coding unit, a prediction mode that is used for the current coding unit and is not the intra-frame skip mode, a partition mode of the current coding unit, or a direction of inter-frame prediction.

5. A method of encoding video, the method comprising:
identifying a type of a current frame comprising a current coding unit in a hierarchical structure of a data unit;
when a prediction mode of the current coding unit is the intra-frame skip mode, performing intra-prediction on the current coding unit to obtain a prediction value, and identifying the prediction value as a reconstructed pixel value without outputting residual information;
when the identified type of the current frame is an intra prediction encoding frame, encoding a 1-bit flag indicating whether an intra-frame skip mode is used for the current coding unit; and
when the identified type of the current frame is an inter prediction encoding frame, encoding a syntax element having an integer value to indicate use of the intra-frame skip mode and additional coding information with respect to the current coding unit.

* * * * *